United States Patent [19]

Loevendie

[11] 4,387,519

[45] Jun. 14, 1983

[54] METHOD FOR CONTROLLING THE POSITION OF THE SUCTION HEAD OF A DREDGE IN RELATION TO THE BOTTOM

[75] Inventor: Rudolf H. Loevendie, Alblasserdam, Netherlands

[73] Assignee: IHC Holland N.V., Papendrecht, Netherlands

[21] Appl. No.: 323,587

[22] Filed: Nov. 20, 1981

[30] Foreign Application Priority Data

Nov. 21, 1980 [NL] Netherlands ................. 8006379

[51] Int. Cl.$^3$ .................................................. E02F 1/00
[52] U.S. Cl. ................................... 37/195; 37/DIG. 1
[58] Field of Search .................. 37/195, DIG. 1, 58, 37/59, 64–67, 72; 367/96, 87, 47, 49, 21

[56] References Cited

U.S. PATENT DOCUMENTS

| | | | |
|---|---|---|---|
| 3,065,815 | 11/1962 | Hersey et al. ......................... | 367/21 |
| 3,736,554 | 5/1973 | Barbier ................................. | 367/21 |
| 3,757,287 | 9/1973 | Bealor, Jr. . | |
| 4,168,484 | 9/1979 | Wright, Jr. ........................ | 367/21 X |
| 4,225,949 | 9/1980 | Price et al. ............................ | 367/96 |

FOREIGN PATENT DOCUMENTS

| | | | |
|---|---|---|---|
| 1249175 | 8/1967 | Fed. Rep. of Germany . | |
| 2413738 | 10/1974 | Fed. Rep. of Germany .......... | 37/66 |
| 2107296 | 5/1972 | France . | |
| 56-12438 | 2/1981 | Japan ..................................... | 37/58 |
| 56-31945 | 3/1981 | Japan ..................................... | 37/58 |
| 6804953 | 10/1969 | Netherlands . | |
| 7314248 | 4/1974 | Netherlands . | |
| 7812267 | 12/1978 | Netherlands . | |
| 7901450 | 8/1980 | Netherlands ........................... | 37/58 |
| 1114286 | 5/1968 | United Kingdom . | |

Primary Examiner—Clifford D. Crowder
Attorney, Agent, or Firm—Young & Thompson

[57] ABSTRACT

Method for controlling the position of the suction head of a dredge in relation to the sludge layer on the bottom of a water way. Acoustic pulses are transmitted in front of the suction head from the dredge to the bottom. The reflected pulses are received and the time difference between the transmitting and the receiving moment is determined as well as the energy difference between the transmitted and received pulses. Based on these differences the configuration and composition of the sludge layers as well as the preferred position of the suction head in relation to said sludge is determined. Thereafter the system for controlling the position of said suction head is operated to bring the suction head into the most favorable position.

1 Claim, No Drawings

METHOD FOR CONTROLLING THE POSITION OF THE SUCTION HEAD OF A DREDGE IN RELATION TO THE BOTTOM

The invention relates to a method for controlling the position of the suction head of a dredge in relation to the bottom, especially for controlling said position in relation to the sludge layer on the bottom.

In river mouths, harbours and other water ways a sludge layer may be deposited on the flooded bottom as result of sediment transport, which sludge layer must be regularly removed to maintain access to these water ways for vessels of relatively large draught.

From an economical view point it is therefore of great importance that only said sludge layer is removed and that not together therewith also part of the bottom, in most cases a sandy layer underneath said sludge layer.

The most suitable instrument for removing such a sludge layer is a dredge, in general consisting of a vessel on which a suction pipe with suction head at the lower end thereof is installed running in the operative position backwards and downwards in the vessel's rearward direction, which suction pipe is connected to a suction pump. Furthermore means are installed on said vessel for adapting the position of the suction head in relation to the material to be dredged, especially in relation to the sludge layer, and said means, controlling in other words the elevation angle of the suction pipe, comprise in general at least one winch, installed on said vessel, the winch cable whereof is wound around a winch drum and the free end of said cable is connected to the suction pipe near the suction head.

Sludge layers have in general an irregular configuration and composition concerning their density and viscosity. In general, seen in a downwards direction, zones of floating sludge, loose sludge and more or less consolidated sludge are found on top of each other with gradually, not sharply defined transitions, whereby the thickness of each of said zones and the position thereof in relation to the sandy layer underneath said sludge layer can vary to a great extent.

It is very important that during the operation of the dredge the suction head is positioned in those zones of the sludge layer which are preferred for sucking up said layer. When the suction head is positioned in a part of said layer having a very low density, then the dredged mixture has a relatively high water content, however when the suction pipe is positioned in a layer section with too high density then the pumps are overloaded. In sludge zones with too high viscosity furthermore great friction losses are encountered in the suction pipe and in the pump. Because of the variations in thickness and position of the different zones of a sludge layer with the resulting variations in density and viscosity, it is necessary to adapt the position of the suction head very often during the operation of the dredge to keep said suction head in the most favourable position.

Until now the suction head is controlled when the pump operation indicates that the suction head has come into an unfavourable part of the sludge layer, and thereby the experience of the dredge master plays a very great role. In this manner the suction head will be controlled in fact always too late and furthermore relatively inaccurately.

An object of the invention is to provide a method for controlling the position of the suction head in relation to the bottom such that the controlling action is caried out in time and relatively accurately.

Said object is according to the invention achieved in that from a point on the dredge in the sailing direction before the suction head, an acoustic pulse series or a number of pulse series each with different frequency is transmitted through the water to the bottom; the reflected pulses are received; the time difference between the transmitting and the receiving moment is determined; the energy of said reflected pulses is measured and compared with the energy of the transmitted pulses; based on these time differences and energy differences the configuration and the composition of the sludge layer as well as the preferred position of the suction head in relation to said sludge layer is determined, whereafter the system for controlling the position of said suction head is operated such that the suction head is brought into the most favourable position in relation to said sludge layer.

Because the acoustical pulse series are transmitted and received at a substantial horizontal distance from the suction head, there will be sufficient time to adapt the position of the suction head based on the data derived from said pulses.

By measuring the time difference between the transmission and reception of a pulse the depth of the reflecting zones can be determined, whereas by measuring the energy loss the absorption rate of the acoustical energy can be determined. Said absorption in the sludge layer is caused by:

(1) the absorption in the sludge particles;
(2) the scattering of energy by the reflecting property of the sludge particles;
(3) the absorption in the water medium, dependent on the temperature and the salt content;
(4) friction losses caused by resonating particles, which losses are viscosity dependent.

The absorption causes mentioned under (1) to (3) are in general dependent on the density of the sludge layer, whereas the absorption mentioned under (4) is mainly viscosity dependent. That means that the absorption of acoustical energy is mainly determined by the density and the viscosity of the sludge, which characteristics determine the efficiency of the dredging operation of the dredge.

According to the invention for each reflection also the value of the product of density and viscosity of the measured sludge zone is determined as a function of the depth, from which data for instance by means of Zarrouk functions the relative division into zones having predetermined values of the above mentioned product can be derived, in the same way as is known for the interpretation of geo-electric soundings as described in the article "Automatic interpretation of Schlumberger sounding curves using modified D. A. S. Zarrouk functions" in "Geological Survey Bulletin" 1313-E, 1975.

I claim:

1. A method for controlling the position of the suction head of a moving dredge in relation to a sludge layer on the bottom, comprising directing, from a point on the dredge, in the direction of movement of the dredge, an acoustic pulse series through the water to the sludge on the bottom a substantial distance in front of the suction head, receiving reflected said pulses, determining the time difference between transmission and reception of the pulses, determining the loss of energy of the reflected pulses in comparison to the transmitted pulses, determining the configuration and composition of the sludge layer on the bottom as well as the preferred position of the suction head in relation to said sludge layer on the basis of the two said differences, and controlling the vertical position of the suction head in accordance with the last-mentioned determination so that the suction head will be in said preferred position when the suction head passes over that position of the sludge layer as to which said last-mentioned determination was made.

* * * * *